Feb. 25, 1930.  R. P. DUNMIRE  1,748,545
CONDUIT FITTING
Filed Oct. 30, 1925

INVENTOR.
Russell P. Dunmire
BY
ATTORNEYS.

Patented Feb. 25, 1930

1,748,545

UNITED STATES PATENT OFFICE

RUSSELL P. DUNMIRE, OF ERIE, PENNSYLVANIA, ASSIGNOR TO ERIE MALLEABLE IRON COMPANY, OF ERIE, PENNSYLVANIA, A CORPORATION OF PENNSYLVANIA

CONDUIT FITTING

Application filed October 30, 1925. Serial No. 65,822.

This invention is designed to improve conduit fittings adapted for use with threadless conduit and is directed particularly to the improving of means for engaging or locking the fitting with the conduit. Features and details of the invention will appear from the specification and claims.

The invention is illustrated in the accompanying drawings as follows:—

Figure 1:
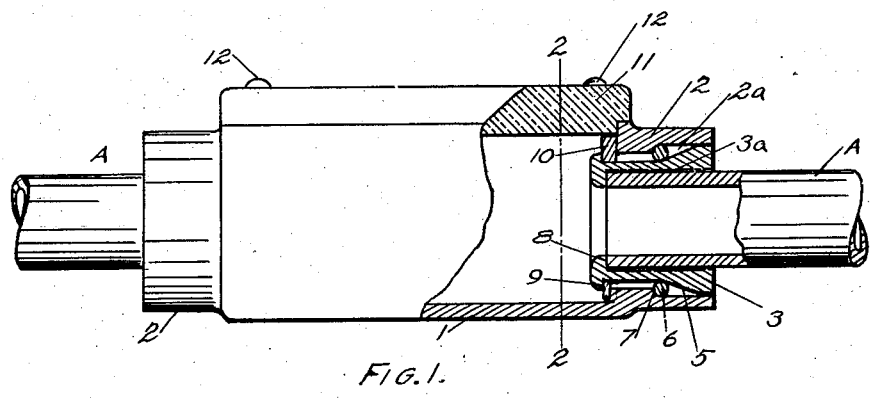

Fig. 1 shows a side elevation of a fitting partly in section.

Figures 2, 3:
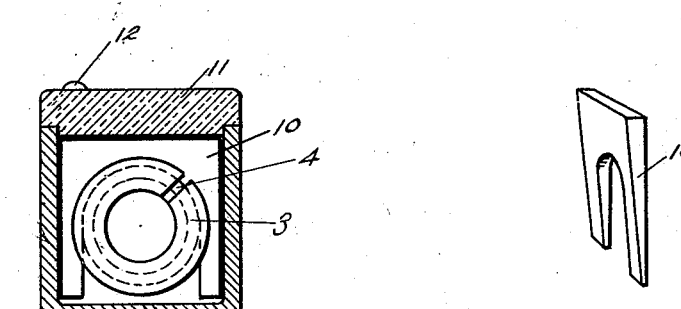

Fig. 2 a section on the line 2—2 in Fig. 1.

Fig. 3 a perspective view of the locking wedge.

Figure 4:
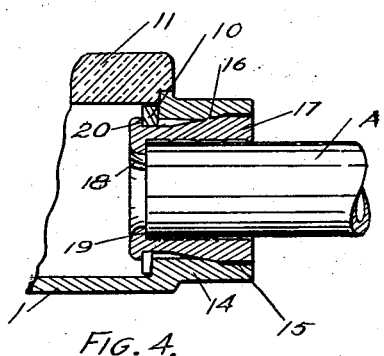

Fig. 4 a sectional view of an alternative construction.

1 marks the body of the fitting, which is exemplified as a conduit box. The box is provided with a conduit extension 2 having a conduit-receiving opening 2ª. A contractible sleeve 3 having a longitudinal slit 4 is arranged in the opening 2ª. This sleeve has a tapered surface 5 which is adapted to engage a sealing ring 6 arranged in the opening 2ª, the sealing ring seating on a shoulder 7 in said opening.

The inner end of the sleeve is provided with a guard shoulder 8 adapted to cover the end of the inserted conduit A and the sleeve has an exterior shoulder 9. A forked wedge 10 is arranged transversely of the sleeve 3 and between the end of the conduit box and the shoulder 9. This wedge is driven into place thus drawing the sleeve endwise. As the sleeve is drawn endwise the tapered surface 5 acting against the ring 6 contracts the sleeve into engagement with the conduit. The sleeve has the serrations 3ª to more thoroughly engage the walls of the conduit and to penetrate the enamel should enamel be provided. A cover 11 is secured in the ordinary manner by screws 12 and is so positioned as to lock the wedge in place.

In the alternative construction the box has an extension 14 with an opening 15 through it. This opening has a tapered wall 16 adapted to receive a similar tapered surface on a contractible sleeve 17. The sleeve has a longitudinal slit 18 so as to facilitate its contraction and a guard shoulder 19 and an external shoulder 20. The wedge 10 is driven in behind the shoulder 20, moving the sleeve 17 endwise and contracting the same through the engagement of the tapered walls of the sleeve and extension and with the contraction of the sleeve the conduit is rigidly engaged.

What I claim as new is:—

1. In a conduit fitting, the combination of a body having a conduit-receiving opening; a slotted contractible sleeve in the opening; means in the opening cooperating with the sleeve and walls of the opening contracting the sleeve upon an axial movement of the sleeve in the opening; a shoulder on the sleeve; and a transverse wedge between the shoulder and the wall of the fitting operating on the sleeve to move it longitudinally to contract the same into engagement with an inserted conduit.

2. In a conduit fitting, the combination of a body having a conduit-receiving opening; a slotted contractible sleeve in the opening; means in the opening cooperating with the sleeve and walls of the opening contracting the sleeve upon an axial movement of the sleeve in the opening; a shoulder on the inner end of the sleeve; and a transverse wedge between the shoulder and the wall of the fitting operating on the sleeve to move it longitudinally to contract the same into engagement with an inserted conduit.

3. In a conduit fitting, the combination of a body having a conduit-receiving opening; a slotted contractible sleeve in the opening; means in the opening cooperating with the sleeve and walls of the opening contracting the sleeve upon an axial movement of the sleeve in the opening; a shoulder on the sleeve; a transverse wedge between the shoulder and the wall of the fitting operating on the sleeve to move it longitudinally to contract the same into engagement with an inserted conduit; and a cover on the fitting locking the wedge in place.

In testimony whereof I have hereunto set my hand.

RUSSELL P. DUNMIRE.